United States Patent
Pryke et al.

(10) Patent No.: US 11,673,506 B2
(45) Date of Patent: Jun. 13, 2023

(54) IMAGE SYSTEM FOR A VEHICLE

(71) Applicant: Jaguar Land Rover Limited, Whitley Coventry (GB)

(72) Inventors: Alexander Pryke, Coventry (GB); Sean Emson, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/429,312

(22) PCT Filed: Jan. 22, 2020

(86) PCT No.: PCT/EP2020/051529
§ 371 (c)(1),
(2) Date: Aug. 6, 2021

(87) PCT Pub. No.: WO2020/160909
PCT Pub. Date: Aug. 13, 2020

(65) Prior Publication Data
US 2022/0105869 A1 Apr. 7, 2022

(30) Foreign Application Priority Data
Feb. 8, 2019 (GB) .................... 1901748

(51) Int. Cl.
*B60R 1/22* (2022.01)
*G06T 7/70* (2017.01)
(Continued)

(52) U.S. Cl.
CPC .............. *B60R 1/22* (2022.01); *G06T 7/60* (2013.01); *G06T 7/70* (2017.01); *G06T 15/04* (2013.01);
(Continued)

(58) Field of Classification Search
CPC ... B60R 1/22; B60R 2300/10; B60R 2300/20; B60R 2300/30; G06T 7/70; G06T 7/60; G06T 15/04; G06T 2207/30252
See application file for complete search history.

(56) References Cited

U.S. PATENT DOCUMENTS

2010/0073152 A1* 3/2010 Nagamine ............... G08G 1/166
340/425.5
2014/0003670 A1* 1/2014 Aimura .................. G06V 20/56
382/104
(Continued)

FOREIGN PATENT DOCUMENTS

| EP | 2955690 A1 | 12/2015 |
|---|---|---|
| WO | 2013053589 A1 | 4/2013 |
| WO | 2018133997 A1 | 7/2018 |

OTHER PUBLICATIONS

Great Britain Intellectual Property Office, Combined Search and Examination Report under Sections 17 and 18(3) Issued in Application No. GB1901748.2, dated Aug. 6, 2019, 7 pages.
(Continued)

*Primary Examiner* — Terrell M Robinson
(74) *Attorney, Agent, or Firm* — McCoy Russell LLP

(57) ABSTRACT

A system comprises: image capture devices associated with a host vehicle and configured to capture image data indicative of an environment of the host vehicle; sensors associated with the host vehicle and configured to capture object data indicative of the presence of an object in a vicinity of the host vehicle; and a processor communicatively coupled to the image capture devices and the sensors to: receive the captured image data and captured object data; aggregate the object data captured by each sensor; determine, in dependence on the aggregated object data, a geometrical parameter of a virtual projection surface; generate a virtual projection surface in dependence on the geometrical parameter;
(Continued)

determine, in dependence on the captured image data, an image texture; and map the image texture onto the generated virtual projection surface.

15 Claims, 9 Drawing Sheets

(51) Int. Cl.
*G06T 7/60* (2017.01)
*G06T 15/04* (2011.01)

(52) U.S. Cl.
CPC ....... *B60R 2300/10* (2013.01); *B60R 2300/20* (2013.01); *B60R 2300/30* (2013.01); *G06T 2207/30252* (2013.01)

(56) References Cited

U.S. PATENT DOCUMENTS

| | | |
|---|---|---|
| 2014/0055487 A1 | 2/2014 | Kiyo et al. |
| 2014/0278065 A1 | 9/2014 | Ren |
| 2014/0347450 A1 | 11/2014 | Han et al. |
| 2015/0178884 A1 | 6/2015 | Scholl et al. |
| 2016/0086333 A1* | 3/2016 | Scholl ............... B60R 1/00 701/300 |
| 2016/0148510 A1* | 5/2016 | Vanholme ............ G08G 1/166 703/6 |
| 2017/0109940 A1* | 4/2017 | Guo ..................... G06T 7/30 |
| 2018/0089899 A1 | 3/2018 | Piemonte et al. |
| 2018/0176533 A1 | 6/2018 | Friebe et al. |
| 2019/0244378 A1* | 8/2019 | Dong ................... G06V 20/00 |
| 2019/0275970 A1* | 9/2019 | Sato .................... B60R 1/00 |

OTHER PUBLICATIONS

ISA European Patent Office, International Search Report and Written Opinion Issued in Application No. PCT/EP2020/051529, dated Mar. 18, 2020, WIPO, 13 pages.

* cited by examiner

IMAGE SYSTEM FOR A VEHICLE

CROSS REFERENCE TO RELATED APPLICATIONS

The present application is a U.S. National Phase of International Application No. PCT/EP2020/051529 entitled "IMAGE SYSTEM FOR A VEHICLE," and filed on Jan. 22, 2020. International Application No. PCT/EP2020/051529 claims priority to Great Britain Patent Application No. 1901748.2 filed on Feb. 8, 2019. The entire contents of each of the above-listed applications are hereby incorporated by reference for all purposes.

TECHNICAL FIELD

The present disclosure relates to an image system and method for a vehicle and to an image system and method for generating a virtual projection surface for use in displaying an image of a surroundings of a vehicle. Aspects of the disclosure relate to a system, a vehicle, and to a method.

BACKGROUND AND SUMMARY

It is known to provide a user of a vehicle with an image of the environment around of the vehicle. To generate this image, an image texture representing the environment of the vehicle can be mapped onto a virtual projection surface disposed around a model of the vehicle. The virtual projection surface defines a 3D geometry onto which one or more 2D images can be mapped, in order to display a 3D image of the surroundings of the vehicle to a user. One such virtual projection surface is described in US patent publication number US2015/0178884 A1. However, one or more objects in the vicinity of the vehicle can appear distorted in the resulting image.

It is an aim of the present disclosure to address one or more of the disadvantages of distortion associated with the prior art.

Aspects and embodiments of the disclosure provide an image system of a host vehicle, a vehicle comprising an image system, and a method of generating a virtual projection surface, as claimed in the appended claims.

According to an aspect of the present disclosure, there is provided an image system of a host vehicle. The image system comprises: a plurality of sensors associated with the host vehicle and configured to capture object data indicative of the presence of at least one object in a vicinity of the host vehicle; and a processor communicatively coupled to the plurality of sensors to receive the captured object data. The processor is configured to: aggregate the object data captured by each of the plurality of sensors; and determine, in dependence on the aggregated object data, one or more geometrical parameters of a virtual projection surface. The processor may be configured to generate a virtual projection surface in dependence on the one or more geometrical parameters or to output the one or more geometrical parameters to a further vehicle system. The image system may further comprise one or more image capture devices associated with the host vehicle and configured to capture image data indicative of an environment of the host vehicle. The processor may be communicatively coupled to the one or more image capture devices to receive the captured image data. The processor may be configured to: determine, in dependence on the captured image data, an image texture; and map the image texture onto the generated virtual projection surface.

According to an aspect of the present disclosure, there is provided a vehicle comprising any aspect or embodiment of the image system.

According to an aspect of the present disclosure, there is provided a method for generating a virtual projection surface using an image system of a host vehicle. The method comprises: capturing object data indicative of the presence of at least one object in a vicinity of the host vehicle; aggregating the captured object data; and determining, in dependence on the aggregated object data, one or more geometrical parameters of a virtual projection surface. The method may comprise generating a virtual projection surface in dependence on the one or more geometrical parameters or outputting the one or more geometrical parameters to a further vehicle system. The method may comprise: capturing image data indicative of an environment of the host vehicle; determining, in dependence on the captured image data, an image texture; and mapping the image texture onto the generated virtual projection surface.

According to an aspect of the present disclosure, there is provided a non-transitory computer readable medium comprising computer readable instructions that, when executed by a processor, causes performance of any aspect or embodiment of the method.

Typically, a virtual projection surface with a fixed geometry has been used. By using object data to determine one or more geometrical parameters of the virtual projection surface, i.e. by adjusting or modifying the geometry of the virtual projection surface, distortion of the objects in any resulting image or representation (generated in dependence on the mapped image texture) can be reduced. For instance, adjustments to the geometrical parameters can be made in dependence on the one or more objects identified in order to provide a more realistic representation of a vehicle's surroundings to a user of the vehicle. In this way, safety may be improved. This can be of relevance when a vehicle's surroundings are presented to a user in a perspective view, since distortion can be greater in perspective view than in, for example, a plan view. Moreover, distortion can be reduced within the need to assume complex or irregular geometries for the virtual projection surface, which can reduce computational resources in calculating and generating the virtual projection surface. This may also improve utility when the vehicle is moving, since complex geometries will not need to be constantly recalculated, which could prove distracting to a user viewing the resulting image.

By aggregating object data from a plurality of sensors, aspects of the disclosure may be more robust, and may operate more effectively in adverse conditions. For example, when one or more of the sensors are not operating correctly due to inclement weather or a malfunction (or for any other reason), the aggregated data can help compensate for the reduction in the number of fully operational sensors and so can allow objects to be identified in a more robust manner.

Optionally, in any of the above aspects, the plurality of sensors operate in the non-visible portion of the electromagnetic spectrum, or operate using pressure waves (for example, ultrasound). By using image capture device(s) for image data in combination with other such sensors for capturing the object data, the geometrical parameter(s) may be adjusted or modified even in conditions where visibility of the objects surrounding the vehicle is poor. In other words, other information about the vehicle environment can be used to correct or improve the images captured by the image capture device(s). Optionally, the plurality of sensors capture images of the vehicle surroundings and properties of objects are ascertained from the images themselves.

Optionally, in any of the above aspects, the one or more geometrical parameters define an extent of a ground plane of the virtual projection surface. The ground plane is representative of a surface on which the host vehicle rests; for example, the road in the immediate vicinity of the vehicle may be represented as a plane. The extent (i.e. the size) of the ground plane can be dependent on properties of the objects which surround the vehicle; this arrangement may allow distortion of the objects in any image or representation of the surroundings of the vehicle to be reduced, for example by preventing the mapping of a 3D object near the vehicle onto the ground plane.

Optionally, in any of the above aspects, the virtual projection surface is curved beyond the ground plane, more optionally the virtual projection surface is parabolic beyond the ground plane. A curved or parabolic virtual projection surface can facilitate a more realistic representation of objects in the vicinity of the vehicle than other surface geometries. Distortion of the objects surrounding the vehicle may therefore be reduced. This can improve safety because the size of the object, or a distance between the object and the vehicle, may be more realistically represented to a user. Optionally, the curvature of the virtual projection surface is uniform all around the ground plane, i.e. the virtual projection surface has a regular geometry.

Optionally, to determine the one or more geometrical parameters, the method comprises, or the processor is configured to: determine a height of the least one object; and determine a curvature of the virtual projection surface beyond the ground plane in dependence on the height. By basing the curvature of the curved (or, optionally, of the parabolic) portion of the virtual projection surface on the height of the object(s) around the vehicle, distortion of the objects due to the curvature may be reduced. This can facilitate a more realistic representation of the size and shape of the object to a user and thus improve safety.

Optionally, to determine the one or more geometrical parameters, the method comprises, or the processor is configured to: determine an average of a distance between each of the least one object and the host vehicle; and determine the extent of the ground plane in dependence on the determined average distance. In this way, distortion of the objects in any image or representation of the surroundings of the vehicle may to be reduced, for example, by preventing the mapping of a 3D object near the vehicle onto the ground plane, which could indicate to a user that the object was lying on the ground. A more realistic representation of surroundings of the vehicle may therefore be provided, and safety may therefore be improved.

Moreover, by considering the average distance between all of the objects and the vehicle, objects closer to the vehicle (which are usually of higher importance to a user) can be better represented to a user in aspects of the disclosure without excessively distorting further away objects in the resulting image or representation. A balanced reduction in object distortion may therefore be achieved. Optionally, the extent of the ground plane is positively correlated with the determined average distance; for example, the ground plane can have a larger extent if objects are further away from the vehicle on average than if the objects are closer to the vehicle. A more realistic representation of surroundings of the vehicle may therefore be provided.

Optionally, in any of the above aspects, the one or more geometrical parameters comprise one or more of a radius, a semi-major axis, or a semi-minor axis of the ground plane. For example, the ground plane may be elliptical or circular, depending on a size and geometry of the vehicle. By choosing the ground plane shape to suit the vehicle geometry, the full surroundings of the vehicle can be represented in a consistent manner. For instance, when the virtual projection surface has a uniform, or regular, geometry, the full surroundings of the vehicle can be represented in a consistent manner. This approach of consistent object representation around the vehicle can improve utility to the user, and can therefore improve safety. It will be understood that any other suitable shape of ground plane may be provided, and the extent may be any suitable geometrical parameter representative of a size of that shape.

Optionally, to aggregate the object data, the method comprises, or the processor is configured to: determine a distribution of the least one object around the host vehicle. Optionally, to determine the one or more geometrical parameters, the method comprises, or the processor is configured to: determine the extent of the ground plane in dependence on the determined distribution. This arrangement can allow the ground plane to extend to a position closer to that at which a majority of objects are located, thereby providing better representation of the clustered objects without excessively distorting isolated or individual objects. A balanced reduction in the object distortion can therefore be achieved. Optionally, the extent is negatively correlated with the determined distribution. For example, for a given average object distance, the ground plane may extend less far if the objects are distributed around a larger proportion of the vehicle's surroundings than if the objects are distributed around a smaller proportion of the vehicle's surroundings. This can provide for a more balanced representation of the surrounding of the vehicle and help to reduce distortion of the objects.

Optionally, in any of the above aspects, the captured object data is indicative of the presence of at least one object within at least one of a plurality (i.e. within one of a number) of zones in the vicinity of the host vehicle. To determine a distribution of the at least one object around the host vehicle, the method comprises, or the processor is configured to: determine, in dependence on the captured object data, a ratio of the number of zones comprising at least one object to the total number of zones. In another embodiment, the method comprises, or the processor may be configured to: determine a ratio of the number of zones comprising at least one object to the number of zones not comprising at least one object. Such calculations may be more computationally efficient than alternative methods of determining a distribution, which may improve use of the system in real-time applications. Optionally, the extent is negatively correlated with the determined ratio; for example, if an object is distributed around 75% of a vehicle, the ground plane may be smaller than if the object is distributed around 25% of the car. This may facilitate better representation to a user of the larger, or the more closely clustered, object(s) identified in the vehicle surroundings, as appropriate. This can improve safety.

Optionally, in any of the above aspects, the one or more geometrical parameters comprises an offset of a centre of the virtual projection surface relative to a centre of the host vehicle. To determine the one or more geometrical parameters, the method comprises, or the processor is configured: to determine the offset in dependence on the determined distribution. This offset can facilitate provision of a virtual projection surface which facilitates better representation of the majority of objects in the vicinity of a vehicle, without distorting other objects by unnecessarily adjusting the extent of the ground plane. This arrangement can provide for an improved balance in the visual representation to a user of information regarding the properties of both near and far objects.

Optionally, in an embodiment, the method comprises, or the processor is configured to: generate an image in dependence on the mapped image texture, or to provide the mapped image texture to a further vehicle system for generation of an image in dependence on the mapped image texture. The image is a visual representation of the vehicle surroundings, and may comprise a representation of the vehicle itself (for example, a model of the vehicle), optionally located on the ground plane. Generating an image may optionally comprise applying a perspective to the mapped image texture. For example, the mapped image texture may be shown in a plan view to generate the image, or in a perspective view.

Optionally, the processor comprises one or more electronic processors having an electrical input for receiving the captured object data, and optionally for receiving the captured image data, and an electronic memory device electrically coupled to the electronic processor and having instructions stored therein. The processor being configured to perform any of the above operations comprises the one or more electronic processors being configured to access the memory device and execute the instructions stored therein such that it is operable to perform the above operations.

Optionally, the vehicle comprises a display which is configured, in a camera view, to display an image. Optionally, the display is configured, in a camera view, to display an image generated in dependence on the mapped image texture. Surroundings of the vehicle may therefore be represented to a user. Optionally, the vehicle comprises one or more further vehicle systems arranged to, as appropriate, generate a virtual projection surface in dependence on the one or more output geometrical parameters and/or determine, in dependence on captured image data, an image texture and map the image texture onto the generated virtual projection surface.

Optionally, the method comprises, or the processor is configured to: receive captured object data and determine one or more geometrical parameters of a virtual projection surface prior to entry of the display into the camera view. In other words, before activation of a camera view the geometrical parameters are determined (for example, calculated or chosen) as if the camera view were to be activated. This partially dynamic arrangement can facilitate real time use of the image system without requiring the computational resources needed for a fully dynamic system in which the virtual projection surface is modified on-the-fly. Moreover, user engagement may be increased since the perspective and boundaries of the image displayed to a user does not continuously change, which could be distracting and potentially unsafe. Utility of the above aspects may therefore be improved.

Geometrical parameters of the virtual projection surface are determined in dependence on properties of the objects surrounding a vehicle in order to reduce distortion of the objects in a subsequent visual representation, or image, of the vehicle surroundings.

Within the scope of this application it is expressly intended that the various aspects, embodiments, examples and alternatives set out in the preceding paragraphs, in the claims and/or in the following description and drawings, and the individual features thereof, may be taken independently or in any combination. That is, all embodiments and/or features of any embodiment can be combined in any way and/or combination, unless such features are incompatible.

The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the disclosure will now be described, by way of example only, with reference to the accompanying drawings, in which:

—FIG. 3A shows example distributions of objects around a vehicle, and FIG. 3B shows a schematic representation of zones around the vehicle for determining the distribution of the objects;

—FIG. 4A shows the virtual projection surface in a plan view, and FIG. 4B shows the virtual projection surface in a side view;

DETAILED DESCRIPTION

Figure 1:
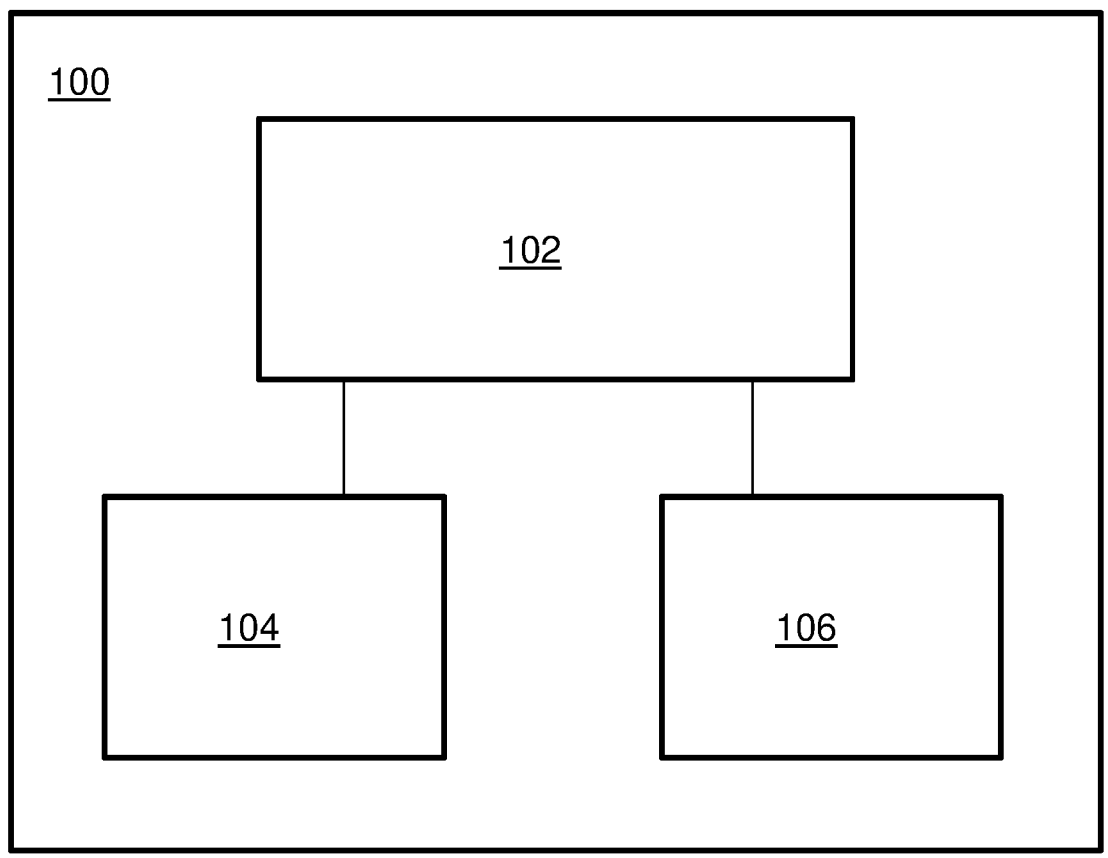
FIG. 1 shows a block diagram of an image system in accordance with an embodiment of the disclosure.
Figure 2:
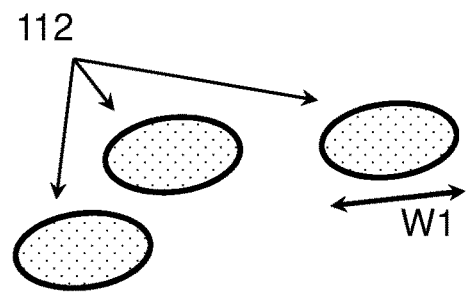
FIG. 2 shows a block diagram of a vehicle comprising the image system of FIG. 1 and a vicinity of the vehicle.
Figure 2:
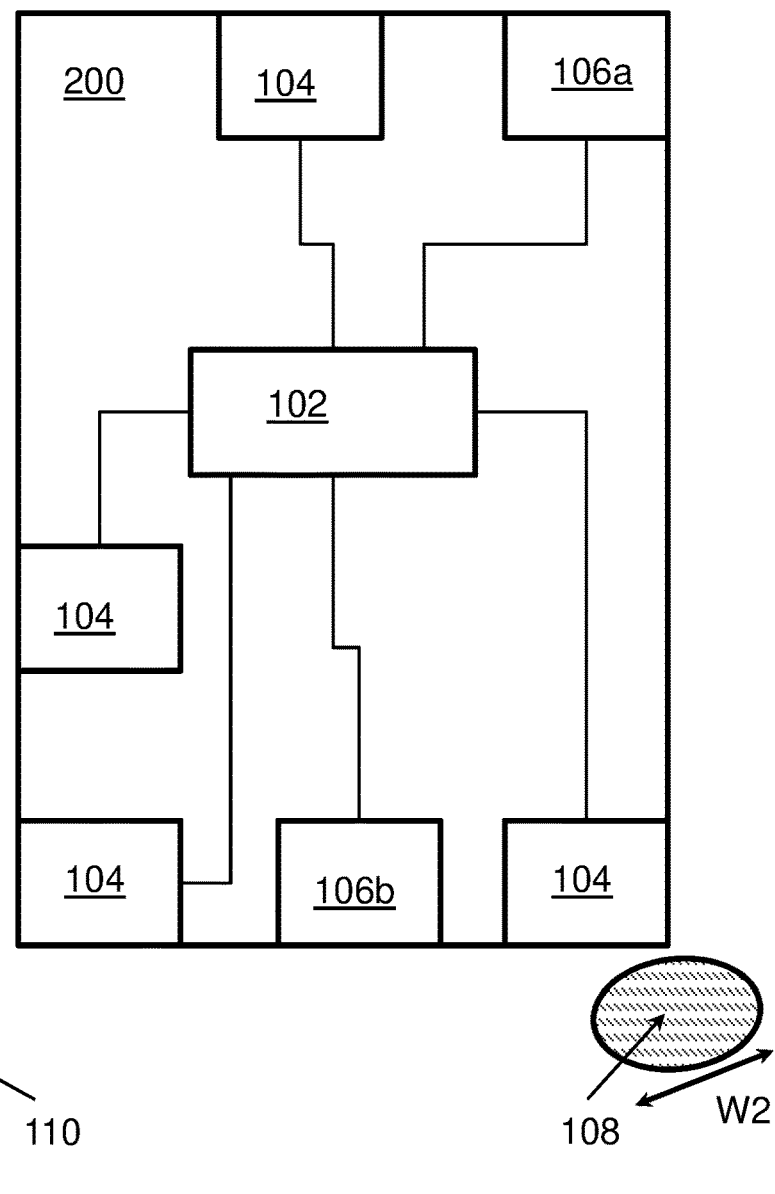

An image system 100 in accordance with an embodiment of the present disclosure is described herein with reference to the accompanying FIGS. 1 and 2.

With reference to FIG. 1, the (image) system 100 comprises a processor 102 and a plurality of sensors 104. The system also comprises one or more image capture devices 106. Processor 102 is communicatively coupled to the one or more image capture devices 106 and the plurality of sensors 104.

Each image capture device 106 may be a camera or a video camera, or any other device configured to capture image data. Where more than one image capture device 106 is provided, the devices 106 need not be the same type of device.

Each of the plurality of sensors 104 is configured to capture object data indicative of a presence of one or more objects in the vicinity of the sensor. Such object data can be captured by any suitable sensing means. For example, objects may be sensed by proximity sensors 104 using pressure waves (such as sound waves), electromagnetic waves (for example ultraviolet, visible, or near infrared light), or any other suitable means of sensing. In the embodiment described herein, ultrasound is used to sense the presence of the objects, but LIDAR may be used as an alternative, for example.

With reference to FIG. 2, the image system 100 is provided within a host vehicle 200. Each of the one or more image capture devices 106 are associated with the vehicle 200. The image capture devices 106 (here shown as two devices 106a, 106b) may be distributed around an interior or exterior of the vehicle, as appropriate. In this embodiment, image capture devices 106a, 106b are provided at the front and rear of the vehicle 200 respectively; image data of the sides of the vehicle may then be interpolated from these front and rear image capture devices 106. In other arrangements, image capture devices may be provided in any suitable location of vehicle 200, i.e. at the front, rear and/or sides, and in the centre of the vehicle, along one or more sides of the vehicle, or at one or more corners of the vehicle, as appropriate.

The image capture devices 106 are configured to capture image data of an environment, or the surroundings, of the vehicle 200. In this embodiment, devices 106 are configured to capture image data representative of one or more of objects 108, 110 and 112, distributed around the vehicle 200. Each of the one or more image capture devices 106 captures image data from the environment of that device; the extent of the environment covered by each device, and from which image data is captured by the device, is dependent on a type of image capture device 106. For example, a fisheye lens has a very wide angle, or field, of view and so may capture a large portion of the environment surrounding the vehicle 200, whilst other types of lenses may have smaller fields of view.

In this embodiment, device 106a captures image data regarding object 112, and device 106 captures image data regarding objects 108 and 110. The processor 102 is configured to receive this image data of the environment of the vehicle from the one or more image capture devices 106. The resulting image data from these two image capture devices is then stitched together by the processor 102 to provide an image texture for use in generating an image representative of all of the objects in the vicinity of the vehicle. This image texture represents the pixels of the stitched images captured by the image capture devices 106, and is a 2D representation of the surroundings of the vehicle 200 including objects 108, 110 and 112.

Each of the sensors 104 are associated with the vehicle 200 and may be located at any suitable location of the vehicle. In this embodiment, sensors 104 are the parking sensors of the vehicle 104 and employ ultrasound to detect the presence of objects. This arrangement may be advantageous, since it obviates the need for additional sensor arrangements to be fitted to the vehicle 200 in order to implement system 100. Optionally, when parking sensors are employed as sensors 104, objects up to 5 or 6 m from the vehicle can be detected by the sensors, but only object data captured from objects within 3 m, optionally 2 m, of the vehicle may be used in any subsequent operations. This may be because accuracy of the sensors decreases at greater object distances. However, it will be understood that the sensors 104 may alternatively be dedicated sensors for system 100, and may use any suitable sensing technology. When the sensors 104 are different to the image capture devices 106, i.e. use a different technology to detect the presence of the object(s) surrounding the vehicle, object data regarding the presence of objects may be captured even in conditions where visibility of the objects surrounding the vehicle is poor. This may improve safety by improving representation of the objects.

Sensors 104 are configured to capture object data indicative of the presence of at least one object in a vicinity of the vehicle 200. In this embodiment, the sensors 104 are configured to capture object data indicative of objects 108, 110 and 112 around the vehicle 200. The object data may be indicative of a width of each of the objects, a height of each of the objects, a distance between each of the objects and the vehicle 200, and the like. Objects 108, 100, 112 may be one or more people, bollards, walls, or any other object.

The processor 102 is configured to receive the object data indicative of the presence of one or more objects in the vicinity of the vehicle from the sensors 104. The processor is configured to aggregate the captured object data to determine, in dependence on the aggregated data, one or more geometrical parameters of a virtual projection surface onto which the image texture can be mapped (this aggregation and determination of geometrical parameter(s) is described below in more detail). By modifying the geometrical parameters of the virtual projection surface based on the one or more objects whose presence is detected by the sensors 104, distortion of the vehicle environment can thus be reduced in any resulting image. It will be understood that the aggregated object data can be used to calculate the geometrical parameter(s), or to select one or more geometrical parameters from a pre-existing set of parameters stored in a memory. For example, the parameters may be stored in a look-up table, or accessed in any other suitable way.

The geometrical parameters can be calculated or selected to reduce parallax and other image artefacts in any image which is generated in dependence on the mapped image texture. Such artefacts occur because different image capture devices have different fields of view, and thus different projections of a single real-world object; this can cause ambiguities in the resulting image, or duplication (parallax) or removal of one or more objects. By determining geometrical parameters of the virtual projection surface in dependence on the object data, and by stitching together the resulting image data from the respective image capture devices to match the curved surface geometry of the virtual projection surface, such distortions can be reduced. For instance, when forming the image texture the image data can be stitched together at different places to account for the 3D, curved nature of the virtual projection surface onto which the image texture will be mapped.

The aggregation of object data may also provide a more robust image system 100, which may operate more effectively in adverse conditions. When one or more of the sensors are not operating correctly, due to inclement weather or a malfunction for example, the use of aggregated data can help compensate for the reduction in the number of fully operational sensors and so can allow properties and parameters of objects around vehicle 200 to be identified in a more robust manner. Moreover, in conditions where object data cannot be effectively captured, the system 100 can revert to a default, predetermined, virtual projection surface to ensure a user has some visibility of their surroundings, even if the resulting image is slightly distorted.

The mapped image texture can be used to generate an image, or representation, of the surroundings of vehicle 200. For instance, the pixels, or texture, of the 2D images captured by the image capture devices 106 and stitched by the processor 102 are individually mapped to the generated, 3D, virtual projection surface to form a mapped texture. The mapped texture can then be displayed to a user from a certain perspective (such as in a plan or a side view) to generate an image of the vehicle surroundings.

It will be understood that in other examples, system 100 may comprise only the processor 102 and the plurality of sensors 104. The object data captured by the sensors 104 may be aggregated and processed by the processor to generate the one or more geometrical parameters. The geometrical parameters may then be output to a further vehicle system of vehicle 200 for generation of the virtual projection surface, or system 100 may generate the virtual projection surface in dependence on the one or more geometrical parameters and output the virtual projection surface to a further vehicle system of vehicle 200 for subsequent mapping of an image texture.

In an embodiment described with reference to FIGS. 1 and 2, the processor 102 being configured to aggregate the object data comprises the processor 102 being configured to determine an average of a distance between each object and the vehicle 200. With reference to FIG. 2, object 108 is closer to vehicle 200 than object 110, and object 110 is closer to vehicle 200 than object 112. The average distances of these objects, as determined based on the object data captured by sensors 104, can be calculated by processor 112.

In some embodiments, the processor may aggregate the object data by weighting. The processor may aggregate the object data by weighting the distances of objects 108, 110, 112 in accordance with the proximity of each object to the vehicle 200 (for example, by giving a greater or lesser weighting to the distance of object 108 than to that of object 112, as appropriate). The processor may aggregate the object data by weighting the objects 108, 110, 112 based on a size and/or a number of the objects in a given area, for example. The processor may aggregate the object data by weighting the objects in accordance with one or more priority areas around the vehicle (for example, objects in an area to a front and/or a rear of the vehicle may be emphasized by weighting them higher than objects in an area to side of the vehicle). Such weightings can be used in any suitable combination, and weighting of the object data can be combined with any other suitable method of aggregation in order to aggregate the object data.

In an embodiment described with reference to FIGS. 1 and 2, the processor 102 being configured to aggregate the object data comprises the processor 102 being configured to determine a height of each of the objects around the vehicle 200. For example, object 108 may have a height H1, object 110 may have a height H2, and object 112 may have a height H3, as determined by the object data captured by the sensors 104. The height H of objects 108, 110, 112 is not discernible in the plan view of FIG. 2, and so is not labelled. The processor 102 may be further configured to aggregate the object data to determine a width W of each of the objects, in addition to or instead of the height H. With reference to FIG. 2, each object 112 has a width W1, which is smaller than a width W2 of object 108, which is again smaller than a width W3 of object 110. It will be understood that the width W or height H of an object is that which is perceived by one or more respective sensors 104, rather than an actual width of height of an object. For example, objects may be perceived as having different heights and/or widths, depending on their orientation relative to vehicle 200.

In an embodiment described with reference to FIGS. 1 and 2, the processor 102 being configured to aggregate the object data comprises the processor 102 being configured to determine a distribution of the objects around the vehicle 200. For example, processor 102 may determine a proportion of the surroundings of the vehicle 200 which are occupied by objects 108, 110, 112.

This may be performed in any suitable manner.

Figure 3A:
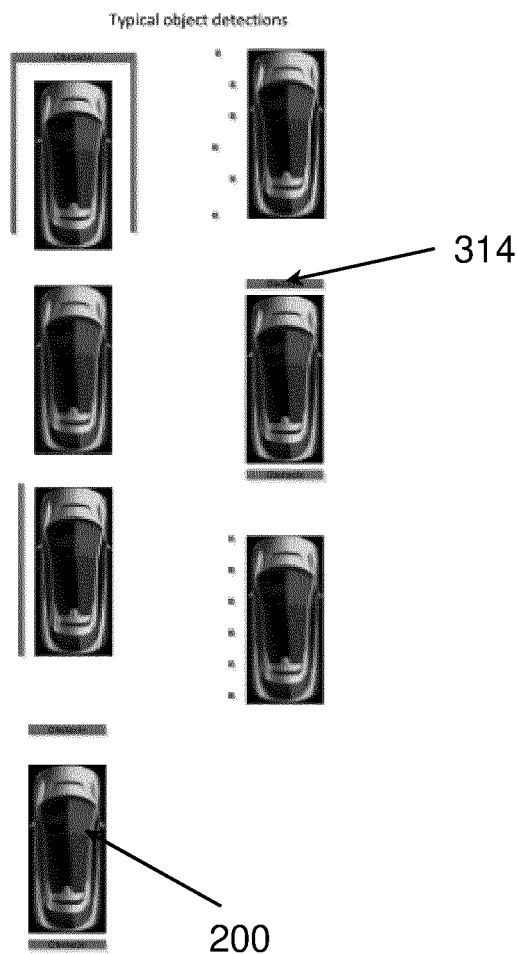
FIGS. 3A and 3B illustrate object distributions in accordance with an embodiment of the disclosure
Figure 3B:
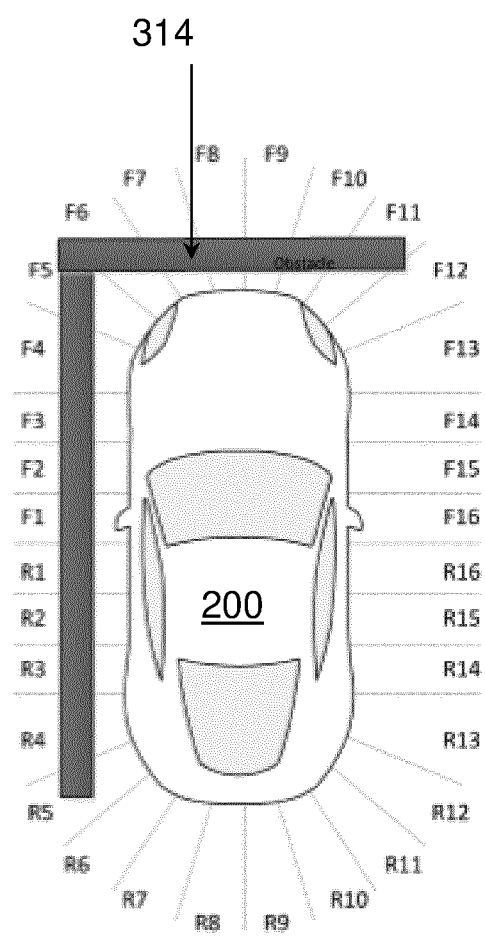

With reference to FIGS. 3A and 3B, processor 102 being configured to determine a distribution of the objects around a vehicle 200 is described in more detail in accordance with an embodiment. FIG. 3A illustrates seven different arrangements of objects 314 around vehicle 200. Objects 314 can comprise one or more of the objects 108, 110, 112 described above, or any other object. The object data captured by sensors 104 of vehicle 200 (sensors not shown) is indicative of the presence of at least one object 314 within at least one of a number of zones surrounding the vehicle 200, which zones are exemplified in FIG. 3B (front zones F1-F16 and rear zones R1-R16). In accordance with this embodiment, it can be determined what percentage of the vehicle an object is distributed around, for example, if object(s) 314 are distributed around 75% of vehicle 200, or around 25% of the vehicle.

The processor 102 is configured to aggregate the object data to determine the number of zones surrounding the vehicle that have detected presence of an object 314, and to determine, in dependence on the captured object data, a ratio between the number of zones determined to comprise at least one object and the number of zones (i.e. the total, or maximum, number of zones which the sensors 104 can detect objects 314 in). In the example of FIG. 3B, there are a total of 32 zones (the maximum number of zones) and 17 zones (R5 to F12) contain at least part of object 314—i.e. object 314 is distributed around approximately 53% of the vehicle. Any other suitable ratio may additionally, or alternatively, be determined, for example, the processor 102 may be configured to determine a ratio of the number of zones comprising at least one object to the number of zones not comprising at least one object. Such calculations may be more computationally efficient than alternative methods of determining a distribution, which may facilitate improve use of the system in real-time applications.

Figure 4A:
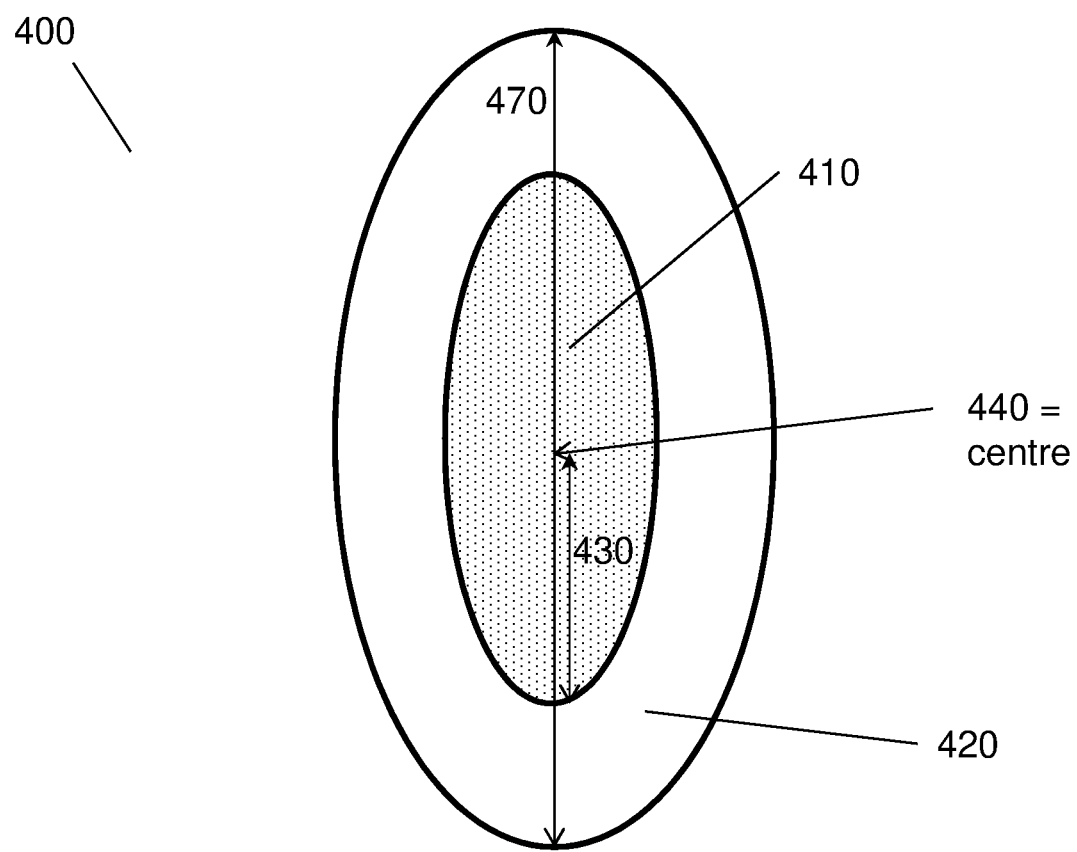
FIGS. 4A and 4B show a schematic representation of a virtual projection surface in accordance with an embodiment of the disclosure
Figure 4B:
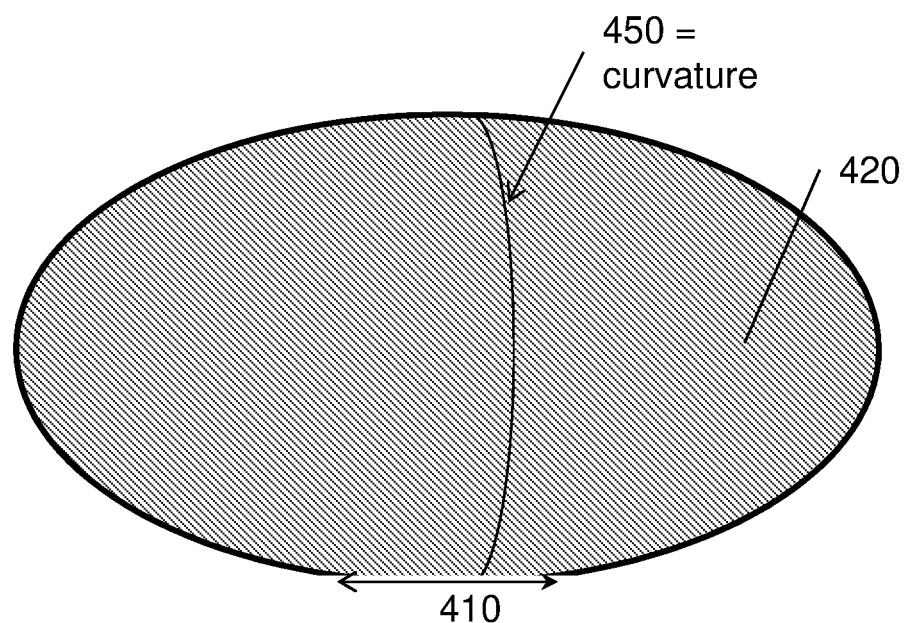

With reference to FIGS. 4A and 4B, properties and parameters of a virtual projection surface 400 are described in more detail.

With reference to FIG. 4A, (virtual projection) surface 400 comprises a ground plane 410. The ground plane 410 is representative of a surface that the host vehicle, for example vehicle 200, rests on. The ground plane 410 can represent, for example, the surface of a road or a driveway. The size of the ground plane 410 can be described by extent 430. The extent 410 represents the geometrical extent (i.e. the size) of the ground plane 410, and can be any suitable parameter of the specific geometry, or shape, of the ground plane 410. Here the ground plane 410 is elliptical in shape and the extent defines the semi-major axis of the ellipse. However, the extent as defined herein can additionally or alternatively define the semi-minor axis of the ellipse, as desired. Optionally, where the ground plane 410 is circular, the extent can be the radius of the circle. Optionally, where the ground plane is a rectangle, the extent can be the width or length of the rectangle, or the diagonal of the rectangle, or any other suitable definition of the geometry of a rectangle. A centre 440 of the ground plane 410 can be defined as the geometrical centre of the ground plane.

With reference to FIG. 4B, virtual projection surface 400 comprises a curved surface 420 beyond the ground plane 410. The curved surface 420 has a curvature 450. The curved surface may have any suitable curvature. In some embodiments, the curved surface 420 may be parabolic. Here the curved surface 420 is uniform around the ground plane. In other words, the curvature 450 is constant the entire way around the virtual projection surface.

Using system 100, the extent 430 and the centre 440 of the ground plane 410, and the curvature 450 of the curved surface 420, along with any other suitable geometrical parameter of the surface 400, can be determined in dependence on the aggregated data, as described below. By taking into account properties or parameters of the objects around the vehicle, system 100 can generate a virtual projection surface 400 which is suitable for mapping the image texture generated from the captured image data such that a single image of the surroundings of the vehicle 200 can be provided which reduces parallax and other distortion of the objects, as discussed above.

In one embodiment, the extent 430 of the ground plane 410 can be determined in dependence on the determined average distance between objects 314 and vehicle 200. This arrangement may allow distortion of the objects in any image or representation of the surroundings of the vehicle to be reduced, for example by preventing the mapping of a 3D object near the vehicle onto the ground plane 410. Additionally or alternatively, the extent 430 of the ground plane 410 can be determined in dependence on the determined distribution of objects 314 around the vehicle 200. This arrangement can allow the ground plane 410 to extend to a position closer to that at which a majority of objects 314 are located. In other words, the point at which the curvature 450 of the virtual projection surface starts is adjusted. This can provide a better representation of the clustered objects, without excessively distorting isolated or individual objects; a balanced reduction in the object distortion can therefore be achieved.

In one embodiment, the extent of the ground plane can be positively correlated with the determined average distance such that the ground plane 410 has a larger extent 430 if, on average, objects 314 are further away from the vehicle 200 than if the objects are closer to the vehicle. A more realistic representation of surroundings of the vehicle 200 may therefore be provided because the curved portion 420 of the virtual projection surface 400 will start further away from the vehicle. The curvature 450 of the curved portion 420 may also be adjusted or altered such that an overall extent 470 of the surface 400 remains the same regardless of the extent 430 of the ground plane, or the curvature 450 of the curved portion may remain the same such that the extent 470 of the surface 400 increases as the extent 430 of the ground plane 410 increases.

In one embodiment, the extent of the ground plane can be negatively correlated with the determined distribution such that, for a given average object distance, the ground plane 410 may have a smaller extent 410 if the objects 314 are distributed around a large proportion of vehicle 200 than if the objects are distributed around a small proportion of vehicle 200. This can provide for a more balanced representation of the surrounding of the vehicle and help to reduce distortion of the objects 314. For example, if an object is distributed around 75% of a vehicle, the ground plane may be smaller than if the object is distributed around 25% of the vehicle, in order to better represent to a user the larger or more closely clustered object(s) identified in the vehicle surroundings, as appropriate. This can improve safety.

Example

In one embodiment, the extent (E) 430 of the ground plane 410 can be defined as:

$$E = O_d + (E_{max} \times (1 - (O_c \times C)))$$

Where:
O$_d$ is the average distance of the objects 314 detected by sensors 104,
E$_{max}$ is the maximum extent of the ground plane (this can be pre-determined and application specific),
O$_c$ is the % concentration of objects around the vehicle (i.e. the distribution), and
C is a tuneable parameter to adjust the sensitivity to the object distribution, which parameter can be pre-determined and application specific.

For example, when O$_d$=0.5 m, E$_{max}$=10 m, C=1.2:
If O$_c$=75%, E=1.5 m;
If O$_c$=50%, E=4.5 m;
If O$_c$=25%, E=8 m.

Figure 5:
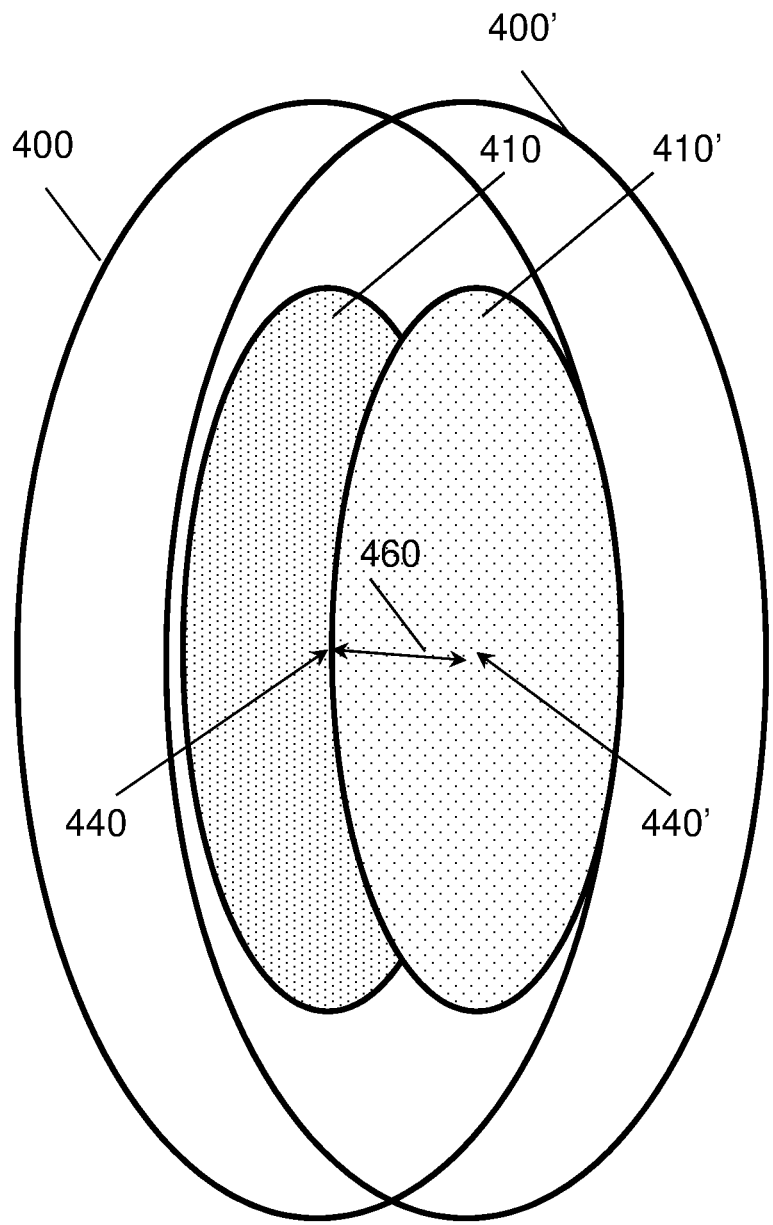
FIG. 5 shows a schematic representation of an offset of a virtual projection surface in accordance with an embodiment of the disclosure.

With reference to FIG. 5, an offset 460 of a centre 440 of the virtual projection surface 400 can be determined in dependence on the aggregated object data. The offset 460 defines a translation of the virtual projection surface 400. For example, the surface 400 can be offset by amount 460 from a centre position 440, which coincides with a centre of the vehicle 200, to a position 440' (which defines the centre of offset surface 400').

In one embodiment, the processor 102 is configured to determine the offset 460 in dependence on the determined distribution. This offset 460 can be used to 'shift' surface 400 towards the majority of the objects, such that the curvature starts at a different point, without distorting other objects by unnecessarily adjusting the extent of the ground plane. This arrangement can facilitate provision of a virtual projection surface which facilitates better representation of the majority of objects in the vicinity of a vehicle and so can provide for an improved balance in the visual representation to a user of both near and far objects.

Example

In one embodiment, the extent (E) 430 of the ground plane 410 can be defined as:

$$\frac{(0_d - E_{max}) \times \left(\frac{sensorZonesOccupied}{sensor\ Zones}\right) + E_{max}}{sensor\ Zones\ Occupied * C} + \text{Tuneable Offset}$$

Where:
O$_d$ is the average distance from the vehicle 200 of the of all objects 314 detected by sensors 104,
Sensor Zones Occupied is the number of zones surrounding the vehicle that have detected an object 314,
Sensor Zones is the maximum number of zones which the sensors 104 can detect objects 314 in (i.e. the total number of zones, as illustrated in FIG. 3B)
E$_{max}$ is the maximum extent of the ground plane (this can be pre-determined and application specific),
C is a tuneable parameter to adjust the sensitivity to the object distribution, which parameter can be pre-determined and application specific. In other words, C is a sensitivity factor influencing how much the change in the ground plane extent varies as a function of the distribution (here, the % of occupied sensor zones), and
Tuneable Offset is a tuneable parameter influencing the offset 460 of the virtual projection surface 400.

Figure 6:
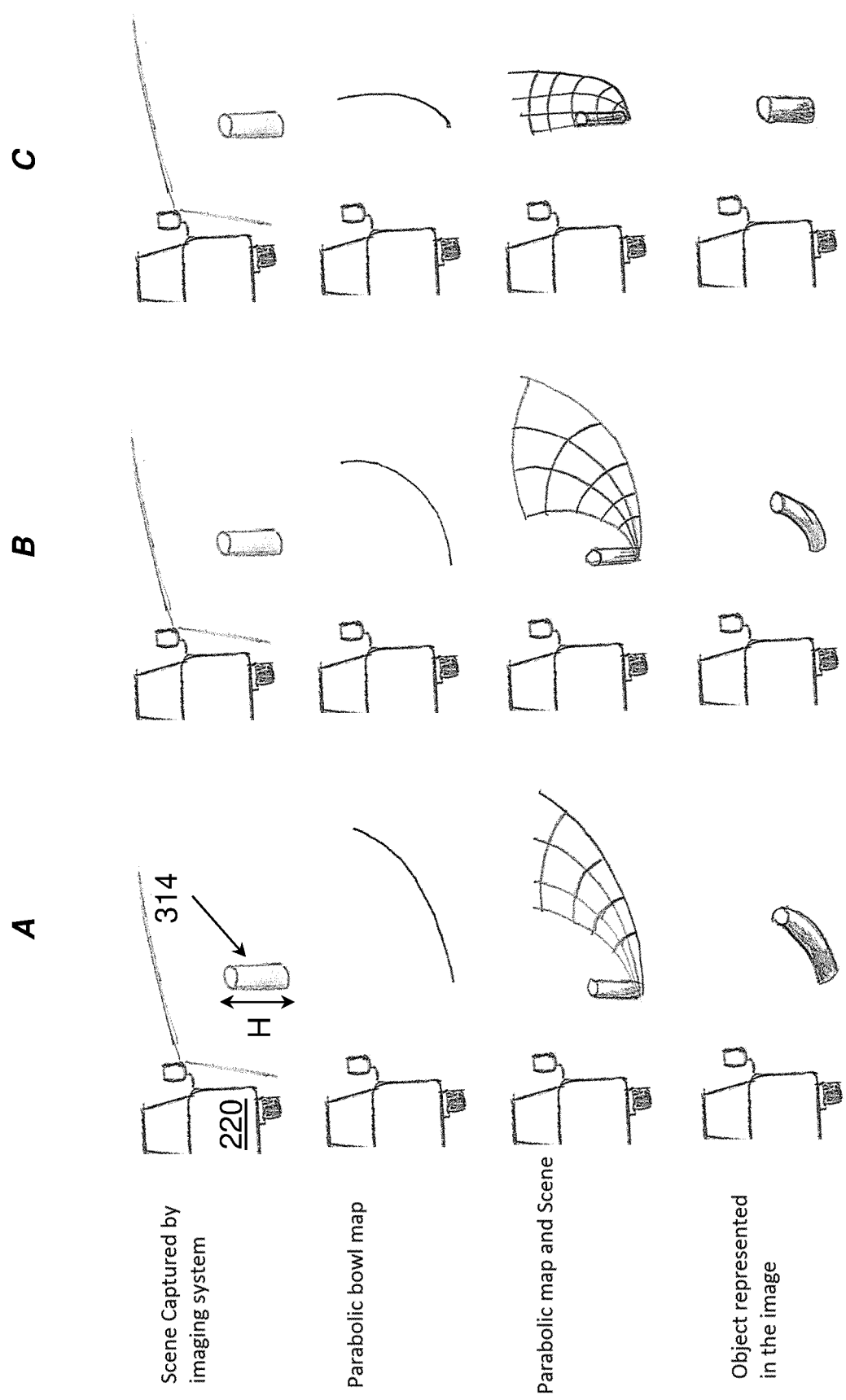
FIG. 6 shows a schematic representation of the effect of curvature of a virtual projection surface on the resulting representation of an object, in accordance with an embodiment of the disclosure.

With reference to FIG. 6, the effect of variations in the curvature 450 of curved portion 420 of virtual projection surface 400 is described. Curvature is an important parameter of the virtual projection surface 400. When objects 314 around vehicle 200 are higher than the ground plane 410, the resulting image or representation of the vehicle surroundings can be distorted; this is because, once the image texture representing these objects is mapped to the virtual projection surface 400, the objects will follow the curvature of the virtual projection surface 400. For instance, depending on the curvature 450 of the curved portion 420 of the surface 400, the objects can either appear flat, as if they were on the ground, or highly curved. FIG. 6 shows a parabolic virtual projection surface (or a parabolic 'bowl') for mapping the image texture.

For instance, FIG. 6A shows the effect of a small curvature in the curved surface relative to the ground plane 410, FIG. 6B shows the effect of a medium curvature in the curved surface relative to the ground plane 410, and FIG. 6C shows the effect of a large curvature in the curved surface relative to the ground plane 410. The object and surrounding scene captured by the image capture devices 106 is identical in each scenario (top row of images). However, the curvature of the curved surface 450 can have a significant effect on how the captured image data of the object 314 is represented in the resulting image, generated based on the image texture mapped to the virtual projection surface 400. With the small curvature, the object 314 is shown as highly distorted in the resulting image (bottom row of image of FIG. 6A). However, the distortion decreases as the curvature 450 of the projection surface 400 increases relative to the ground plane 410. With the largest curvature, the object is shown in a more representative manner in the resulting image (bottom row of image of FIG. 6C).

The curvature 450 of the virtual projection surface can be determined in dependence on the aggregated object data. In one embodiment, the processor 102 is configured to determine the curvature 450 in dependence on the determined height (H) of the objects 314 around vehicle 200. If the object is tall (large H), increasing the steepness of the curvature of the surface 420 will prevent the object from looking as though it is laying on the ground. However, for a shorter object, the curvature 450 can be decreased. In this way, the curvature 450 of the virtual projection surface 400 that the image texture representing the image is mapped on to can be modified to reduce curvature of the object in the resulting image. Distortion can thus be reduced and safety may therefore be improved.

Figure 7:
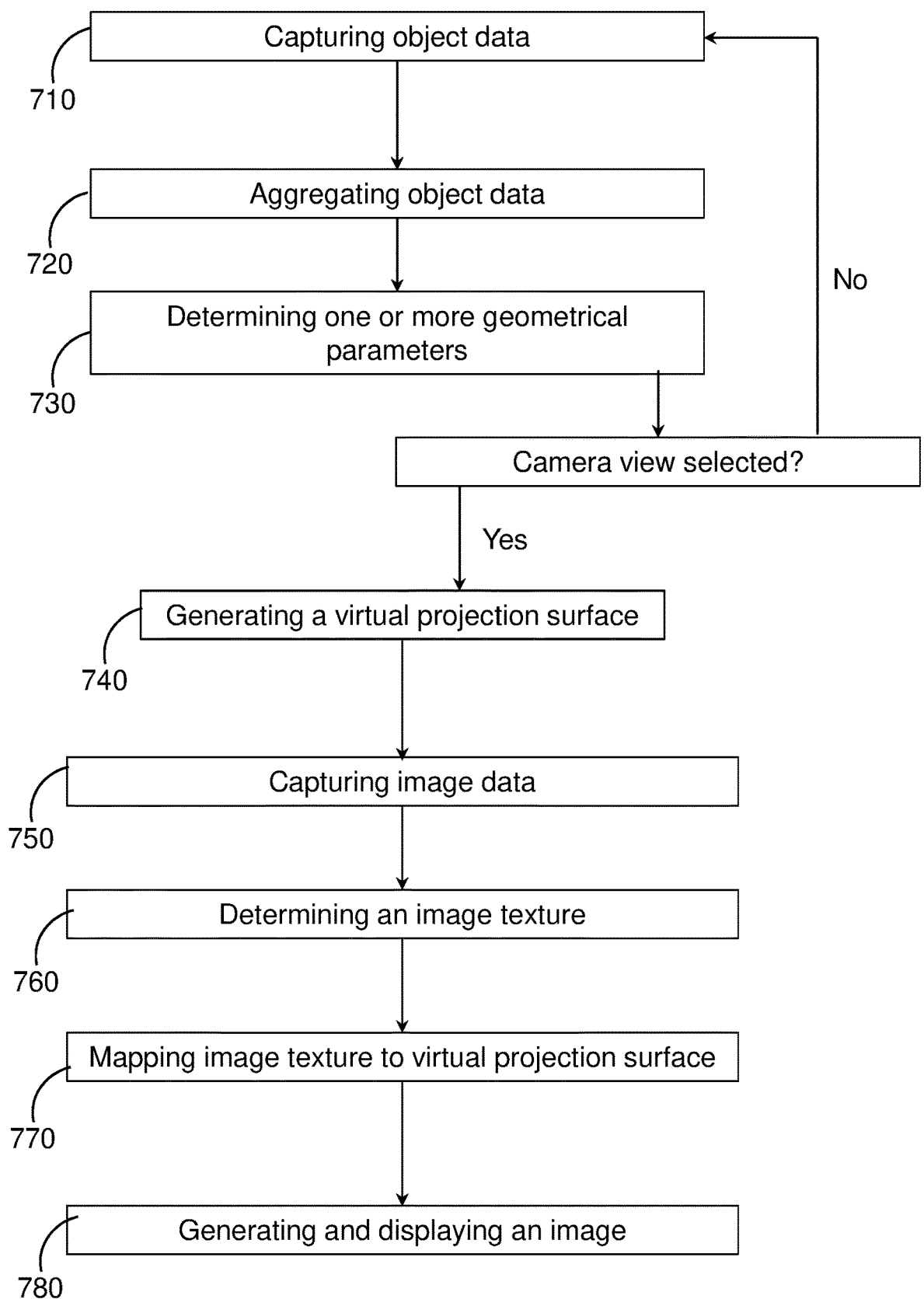
FIG. 7 shows a flow chart of a method in accordance with an embodiment of the disclosure.

A method in accordance with an embodiment of the present disclosure is described herein with reference to the accompanying FIG. 7. Method 700 is a method for generating a virtual projection surface, optionally using an image system 100 of a vehicle, for example, vehicle 200.

The method 700 comprises capturing 710 object data indicative of the presence of at least one object in a vicinity of a vehicle. Operation 710 can occur at any suitable time during operation of the vehicle. When method 700 is performed using image system 100, the object data can be captured by sensors 104, as described above.

The method comprises aggregating 720 the object data captured at step 710 and determining at operation 730, in dependence on the aggregated object data, one or more geometrical parameters of a virtual projection surface. Operations 710, 720 and 730 may be repeated any suitable number of times without any further operations being performed. For example, the geometrical parameters may be continually calculated based on new captured object data in order that the geometrical parameters reflect the current surroundings of the vehicle for possible use in a subsequent operation. This may facilitate use of method 700 in real time applications since latency may be reduced. The process may optionally be repeated until a camera view is selected.

In other words, before activation of a camera view the geometrical parameters are determined (for example, calculated or chosen) as if the camera view were to be activated. This partially dynamic arrangement can facilitate real time use of the image system without requiring the computational resources needed for a fully dynamic system in which the virtual projection surface is modified on-the-fly. Moreover, user engagement may be increased since the perspective and boundaries of the image displayed to a user does not continuously change, which could be distracting and potentially unsafe. To achieve this partially dynamic operation, sensors can be arranged to continually (or periodically at any suitable frequency, for example at a frequency of between 0.1 to 150 times a second, optionally at a frequency between 1 and 15 times a second, such as at a frequency of 2 times a second, 5 times a second, 9 times a second, 14 times a second, etc.) capture object data and determine the one or more geometrical parameters in dependence on aggregated object data.

After the camera view is selected, method 700 further comprises generating 740 a virtual projection surface in dependence on the one or more geometrical parameters determined at operation 730. In some embodiments, the method comprises capturing 750 image data indicative of an environment of the vehicle. Operation 750 may occur together with or separately from operation 710. Operation 750 can occur at any suitable time during operation of the vehicle. The method may further comprise determining 760, in dependence on the captured image data, an image texture and mapping 770 the image texture onto the generated virtual projection surface. The image texture may also be determined in dependence on, or taking into account, the object data; for example, the image texture may be determined in dependence on the one or more geometrical parameters. Method 700 may further comprise generating and displaying 780 an image in dependence on the mapped image texture for display to a user.

If camera view is not selected, operations 740 to 780 may not be performed and no image is displayed to a user. However, it will be understood that in method 700 the camera view may be selected at any suitable time; that is, any suitable combination of operations 710 to 780 may be repeated until selection of camera view by a user, at which point the remaining operations of method 700 may be performed in order that an image may be generated and displayed to a user.

Figure 8:
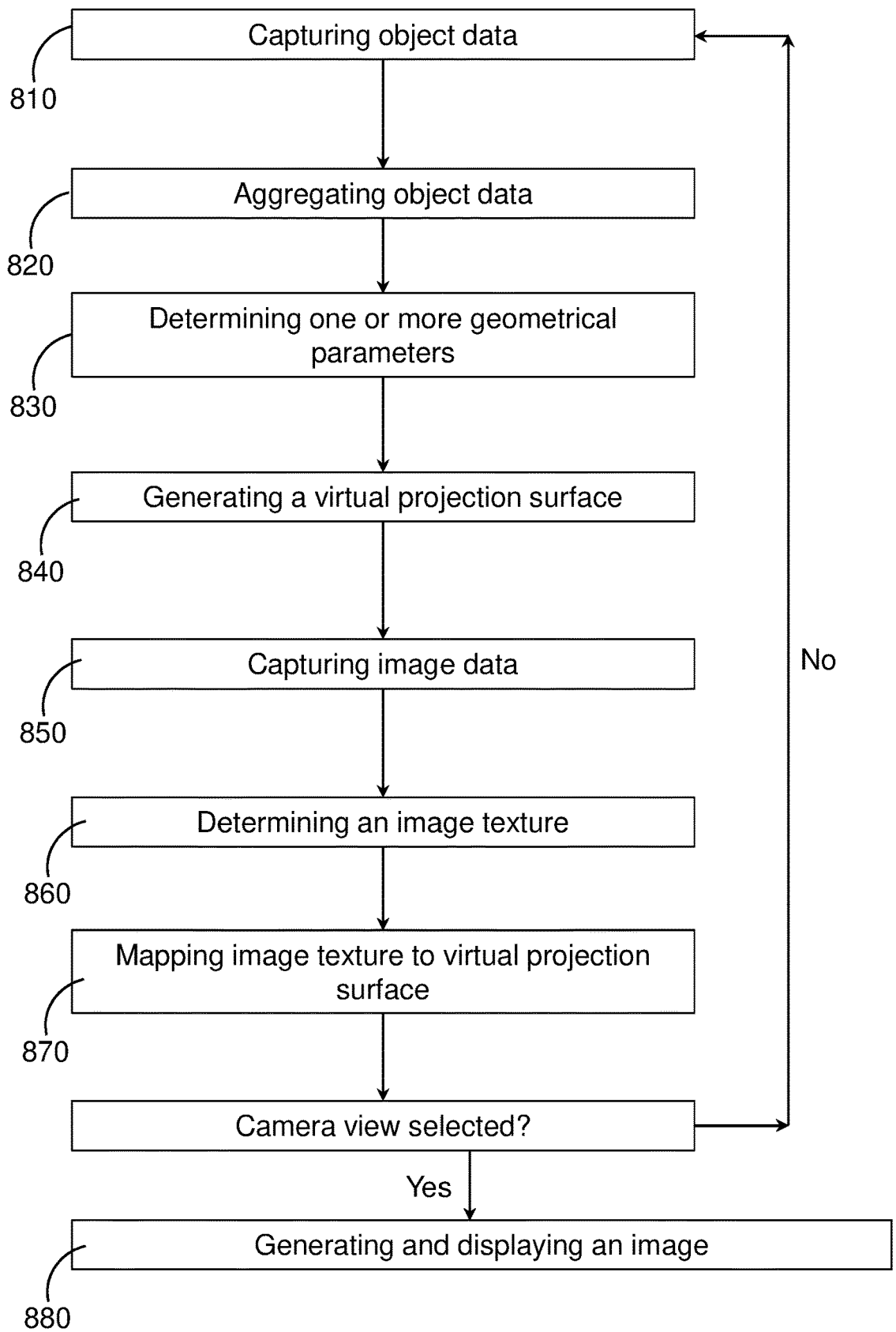
FIG. 8 shows a flow chart of a method in accordance with an embodiment of the disclosure.

A method in accordance with an embodiment of the present disclosure is described herein with reference to the accompanying FIG. 8. Method 800 is a method for generating a virtual projection surface, optionally using an image system 100 of a vehicle, for example, vehicle 200.

As described above with respect to method 700, the method 800 comprises capturing 810 object data indicative of the presence of at least one object in a vicinity of a vehicle. Operation 810 can occur at any suitable time during operation of the vehicle. When method 800 is performed using image system 100, the object data can be captured by sensors 104, as described above. The method comprises aggregating 820 the object data captured at operation 810 and determining at operation 830, in dependence on the aggregated object data, one or more geometrical parameters of a virtual projection surface.

The above descriptions of operations 710 to 730 applies to operations 810, 820 and 830, which may be repeated any suitable number of times without any further operations being performed. For example, the geometrical parameters may be continually calculated based on new captured object data in order that the geometrical parameters reflect the current surroundings of the vehicle for possible use in a subsequent operation. This may facilitate use of method 800 in real time applications since latency may be reduced. The process may optionally be repeated until a camera view is selected.

The method 800 further comprises generating 840 a virtual projection surface in dependence on the one or more geometrical parameters determined at operation 830. In some embodiments, operation 840 may be repeated any suitable number of times without any further operations being performed. For example, the virtual projection surface may be repeatedly determined or calculated based on new captured object data in order that the surface reflects the current surroundings of the vehicle for possible use in a subsequent operation. This may facilitate use of method 800 in real time applications since latency may be further reduced. The process may optionally be repeated until a camera view is selected.

In some embodiments, the method comprises capturing 850 image data indicative of an environment of the vehicle. Operation 850 may occur together with or separately from operation 810. Operation 850 can occur at any suitable time during operation of the vehicle. The method may further comprise determining 860, in dependence on the captured image data, an image texture and mapping 870 the image texture onto the generated virtual projection surface. The image texture may also be determined in dependence on, or taking into account, the object data; for example, the image texture may be determined in dependence on the one or more geometrical parameters.

Steps 850, 860 and 870, together with any of steps 810 to 840 may be repeated any suitable number of times without any further operations being performed. For example, the image texture may be repeatedly mapped onto a generated virtual projection surface based on new captured object data and new captured image data in order that mapped image texture reflects the current surroundings of the vehicle for possible use in a subsequent operation. In this way, any image texture can be quickly and easily mapped to the generated virtual projection surface when a user desires to use the camera view of the vehicle's display. This may facilitate use of method 800 in real time applications since latency may be reduced. The operations may optionally be repeated until a camera view is selected.

In the implementation of FIG. 8, all of operations 810 to 870 are repeated until the camera view is selected. However, it will be understood that the camera view may be selected at any suitable time; that is, any suitable combination of operations 810 to 870 may be repeated until selection of camera view by a user, at which point the remaining operations of method 800 may be performed in order that an image may be generated and displayed to a user.

Method 800 may further comprise generating and displaying 880 an image in dependence on the mapped image texture for display to a user, optionally, for display after a (user) operation of selecting a camera view. If camera view is not selected, no image is displayed, although it will be understood that an image may still be generated at operation 880. Optionally, the image of operation 880 may be repeatedly generated until a camera view is selected and the generated image can be displayed to a user; this may facilitate use of method 800 in real time applications since latency may be reduced.

In both of method 700 and method 800 it will be understood that, after the camera view is selected by a user, any of the operations may be (repeatedly) performed in order that a user may be provided with an up to date image of their environment. Optionally, the geometrical parameters are fixed after camera view is selected, or are determined (for example, calculated or chosen) at a frequency which is lower than the frequency at which image data is captured. For example, image data may be captured continually (or periodically at any suitable frequency, for example at a frequency of between 0.1 to 150 times a second, optionally at a frequency between 1 and 15 times a second, such as at a frequency of 2 times a second, 5 times a second, 9 times a second, 14 times a second, etc.).

This arrangement can facilitate real time use of the image system without requiring the computational resources needed for a fully dynamic system in which the virtual projection surface is modified on-the-fly. Moreover, user engagement may be increased since the perspective and boundaries of the image displayed to a user does not continuously change, which could be distracting and potentially unsafe, while the image data is captured at a rate high enough to provide a user with an image of their current environment, thereby increasing safety.

Figure 9:
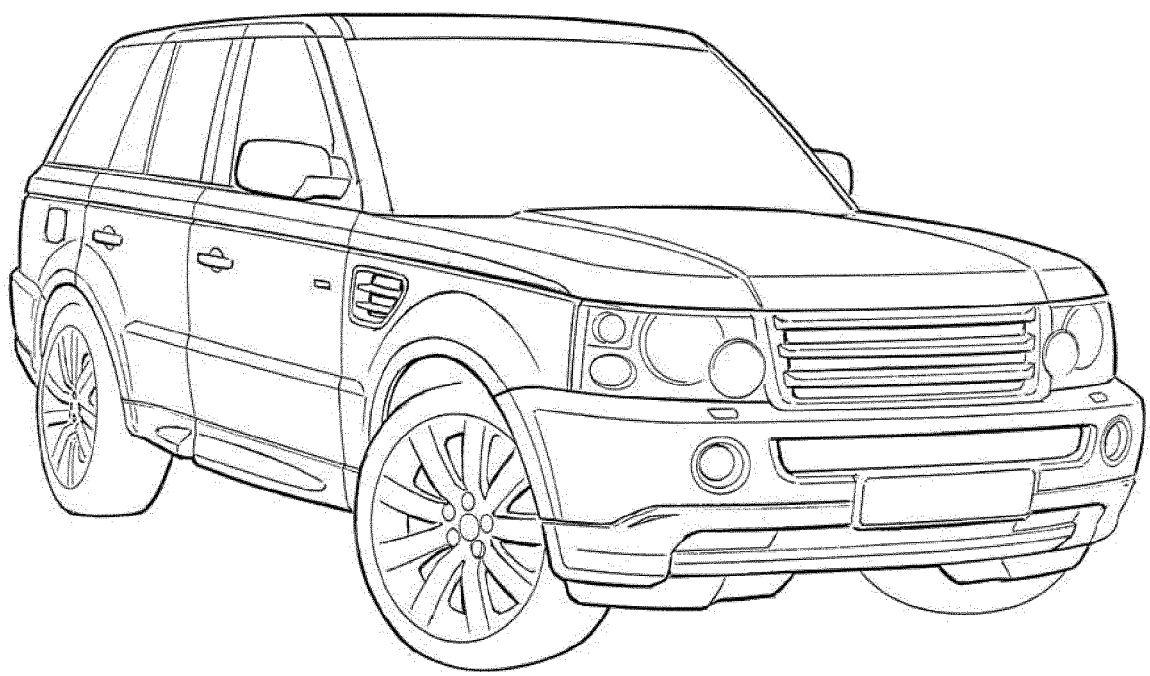
FIG. 9 shows a vehicle in accordance with an embodiment of the disclosure.

A vehicle in accordance with an embodiment of the present disclosure is described herein with reference to the accompanying FIG. 9. This vehicle may comprise any of the above described features of vehicle 200. This vehicle comprises image system 100, which system may be arranged in such a way so as to implement method 700 or method 800. In one embodiment, the vehicle comprises a display which is configured, in a camera view, to display an image generated in dependence on the mapped image texture described above.

It will be appreciated that various changes and modifications can be made to the present disclosure without departing from the scope of the present application.

Some aspects of the disclosure are outlined in the following numbered clauses

1. An image system of a host vehicle, the image system comprising:

one or more image capture devices associated with the host vehicle and configured to capture image data indicative of an environment of the host vehicle;

a plurality of sensors associated with the host vehicle and configured to capture object data indicative of the presence of at least one object in a vicinity of the host vehicle; and a processor communicatively coupled to the one or more image capture devices and the plurality of sensors to receive the captured image data and captured object data, the processor configured to:

aggregate the object data captured by each of the plurality of sensors;

determine, in dependence on the aggregated object data, one or more geometrical parameters of a virtual projection surface;

generate a virtual projection surface in dependence on the one or more geometrical parameters;

determine, in dependence on the captured image data, an image texture; and map the image texture onto the generated virtual projection surface.

2. An image system according to clause 1, wherein the one or more geometrical parameters define an extent of a ground plane of the virtual projection surface, the ground plane representative of a surface on which the host vehicle rests.

3. An image system according to clause 2, wherein the virtual projection surface is curved beyond the ground plane.

4. An image system according to clause 3, wherein to determine the one or more geometrical parameters, the processor is configured to:
determine a height of the least one object; and
determine a curvature of the virtual projection surface beyond the ground plane in dependence on the height.

5. An image system according to clause 3 or clause 4, wherein the virtual projection surface is parabolic beyond the ground plane.

6. An image system according to any one of clauses 2 to 5, wherein, to determine the one or more geometrical parameters, the processor is configured to:
determine an average of a distance between each of the least one object and the host vehicle; and
determine the extent of the ground plane in dependence on the determined average distance.

7. An image system according to clause 5, wherein the extent is positively correlated with the determined average distance.

8. An image system according to any one of clauses 2 to 7, wherein, to aggregate the object data, the processor is configured to determine a distribution of the least one object around the host vehicle and wherein, to determine the one or more geometrical parameters, the processor is configured to determine the extent of the ground plane in dependence on the determined distribution.

9. An image system according to clause 8, wherein the extent is negatively correlated with the determined distribution.

10. An image system according to any of clauses 2 to 9, wherein the one or more geometrical parameters comprise one or more of a radius, a semi-major axis, or a semi-minor axis of the ground plane.

11. An image system according to any of clauses 1 to 7, wherein, to aggregate the object data, the processor is configured to determine a distribution of the least one object around the host vehicle.

12. An image system according to any of clauses 8 to 11, wherein the one or more geometrical parameters comprises an offset of a centre of the virtual projection surface relative to a centre of the host vehicle, and wherein, to determine the one or more geometrical parameters, the processor is configured to determine the offset in dependence on the determined distribution.

13. An image system according to any one of clauses 8 to 12, wherein the captured object data is indicative of the presence of at least one object within at least one of a number of zones in the vicinity of the host vehicle, and wherein, to determine a distribution of the at least one object around the host vehicle, the processor is configured to:
determine, in dependence on the captured object data, a ratio of the number of zones comprising at least one object to the number of zones.

14. An image system according to any preceding clause, wherein said processor comprises one or more electronic processors having an electrical input for receiving the captured image data and the captured object data, and an electronic memory device electrically coupled to the electronic processor and having instructions stored therein, wherein the processor being configured to map the image texture comprises the one or more electronic processors being configured to access the memory device and execute the instructions stored therein such that it is operable to determine the image texture, aggregate the object data and determine the one or more geometrical parameters of a virtual projection surface to generate the virtual projection surface in dependence on the one or more geometrical parameter and map the image texture onto the generated virtual projection surface.

15. A vehicle comprising an image system according to any preceding clause.

16. A vehicle according to clause 15, the vehicle comprising a display configured, in a camera view, to display an image generated in dependence on the mapped image texture.

17. A vehicle according to clause 16, wherein the processor is configured to receive the captured object data and determine the one or more geometrical parameters of the virtual projection surface prior to entry of the display into the camera view.

18. A method for generating a virtual projection surface using an image system of a host vehicle, the method comprising:
capturing image data indicative of an environment of the host vehicle;
capturing object data indicative of the presence of at least one object in a vicinity of the host vehicle;
aggregating the captured object data;
determining, in dependence on the aggregated object data, one or more geometrical parameters of a virtual projection surface;
generating a virtual projection surface in dependence on the one or more geometrical parameters;
determining, in dependence on the captured image data, an image texture; and
mapping the image texture onto the generated virtual projection surface.

19. A non-transitory computer readable medium comprising computer readable instructions that, when executed by a processor, cause performance of the method of clause 18.

The invention claimed is:
1. An image system of a host vehicle, the image system comprising:
one or more image capture devices associated with the host vehicle and configured to capture image data indicative of an environment of the host vehicle;
a plurality of sensors associated with the host vehicle and configured to capture object data indicative of a presence of a plurality of objects in a vicinity of the host vehicle; and
a processor communicatively coupled to the one or more image capture devices and the plurality of sensors to receive the captured image data and captured object data, the processor configured to:
aggregate the object data captured by each of the plurality of sensors;
determine, in dependence on properties of the plurality of objects indicated by the aggregated object data, a geometrical parameter of a virtual projection surface;
generate a virtual projection surface in dependence on the geometrical parameter;
determine, in dependence on the captured image data, an image texture; and
map the image texture onto the generated virtual projection surface,
wherein, to aggregate the object data, the processor is configured to determine a distribution of one or more of the objects around the host vehicle and determine the geometrical parameter in dependence on the determined distribution, and wherein, to determine the distribution of the one or more objects, the processor is configured to determine a proportion of the surroundings of the vehicle which are occupied by objects.

2. The image system according to claim 1, wherein:
the geometrical parameter defines an extent of a ground plane of the virtual projection surface, the ground plane representative of a surface on which the host vehicle rests; and
the virtual projection surface is curved beyond the ground plane.

3. The image system according to claim 2, wherein to determine the geometrical parameter, the processor is configured to:
determine heights of the plurality of objects; and
determine a curvature of the virtual projection surface beyond the ground plane in dependence on the heights.

4. The image system according to claim 2, wherein the virtual projection surface is parabolic beyond the ground plane.

5. The image system according to claim 2, wherein, to determine the geometrical parameter, the processor is configured to determine the extent of the ground plane in dependence on the determined distribution.

6. The image system according to claim 2, wherein the geometrical parameter comprises a radius, a semi-major axis, or a semi-minor axis of the ground plane.

7. The image system according to claim 6, wherein the geometrical parameter comprises an offset of a centre of the virtual projection surface relative to a centre of the host vehicle, and wherein, to determine the geometrical parameter, the processor is configured to determine the offset in dependence on the determined distribution.

8. The image system according to claim 6, wherein the captured object data is indicative of the presence of a plurality of objects within zones in the vicinity of the host vehicle, and wherein, to determine the distribution of the plurality of objects around the host vehicle, the processor is configured to:
determine, in dependence on the captured object data, a ratio of a number of the zones comprising at least one of the plurality of objects to the number of zones.

9. The image system according to claim 1, wherein, to aggregate the object data, the processor is configured to determine a distribution of one or more of the objects around the host vehicle.

10. The image system according to claim 1, wherein said processor comprises one or more electronic processors having an electrical input for receiving the captured image data and the captured object data, and an electronic memory device electrically coupled to the one or more electronic processors and having instructions stored therein, wherein the processor being configured to map the image texture comprises the one or more electronic processors being configured to access the electronic memory device and execute the instructions stored therein such that it is operable to determine the image texture, aggregate the object data and determine the geometrical parameter of a virtual projection surface to generate the virtual projection surface in dependence on the geometrical parameter and map the image texture onto the generated virtual projection surface.

11. A vehicle comprising an image system according to claim 1 and a display configured, in a camera view, to display an image generated in dependence on the mapped image texture.

12. The vehicle according to claim 11, wherein the processor is configured to receive the captured object data and determine the geometrical parameter of the virtual projection surface prior to entry of the display into the camera view.

13. The image system according to claim 1, wherein the virtual projection surface is curved beyond a ground plane of the virtual projection surface, the ground plane representative of a surface on which the host vehicle rests.

14. A method for generating a virtual projection surface using an image system of a host vehicle, the method comprising:
capturing image data indicative of an environment of the host vehicle;
capturing object data indicative of a presence of a plurality of objects in a vicinity of the host vehicle;
aggregating the captured object data;
determining, in dependence on properties of the plurality of objects indicated by the aggregated object data, a geometrical parameter of a virtual projection surface;
generating a virtual projection surface in dependence on the geometrical parameter;
determining, in dependence on the captured image data, an image texture; and
mapping the image texture onto the generated virtual projection surface,
wherein aggregating the captured object data includes determining a distribution of one or more of the objects around the host vehicle and determining the geometrical parameter in dependence on the determined distribution, and
wherein determining the distribution of the one or more objects comprises determining a proportion of the surroundings of the vehicle which are occupied by objects.

15. A non-transitory computer readable medium comprising computer readable instructions that, when executed by a processor, cause the processor to perform the method of claim 14.

* * * * *